(12) United States Patent
Byun et al.

(10) Patent No.: US 8,736,856 B2
(45) Date of Patent: May 27, 2014

(54) METHOD OF EXECUTING ADDITIONAL EXTENDED FEATURE OF IMAGE FORMING APPARATUS AND IMAGE FORMING APPARATUS TO PERFORM THE SAME

(75) Inventors: Hyung-sik Byun, Hwaseong-si (KR); Cheol-yon Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 239 days.

(21) Appl. No.: 12/963,909

(22) Filed: Dec. 9, 2010

(65) Prior Publication Data

US 2011/0149322 A1    Jun. 23, 2011

(30) Foreign Application Priority Data

Dec. 23, 2009    (KR) .................. 10-2009-0130036

(51) Int. Cl.
*G06F 3/12* (2006.01)
(52) U.S. Cl.
USPC ........................................ 358/1.13; 717/138
(58) Field of Classification Search
USPC ........................................ 358/1.13; 717/138
See application file for complete search history.

(56) References Cited

U.S. PATENT DOCUMENTS

| 2004/0200903 A1 | 10/2004 | Ohya et al. |
| 2004/0205755 A1* | 10/2004 | Lescouet et al. ............... 718/100 |
| 2006/0010433 A1 | 1/2006 | Neil |
| 2007/0180454 A1 | 8/2007 | Fujimoto et al. |
| 2007/0266389 A1 | 11/2007 | Ganguly et al. |
| 2008/0034364 A1* | 2/2008 | Lam et al. ........................ 718/1 |
| 2012/0314257 A1* | 12/2012 | Osada ........................ 358/1.15 |

FOREIGN PATENT DOCUMENTS

| EP | 2071458 | 6/2009 |
| JP | 2002-041305 | 2/2002 |
| JP | 2008-077186 | 4/2008 |
| JP | 2008-262419 | 10/2008 |
| KR | 2009-0009866 | 1/2009 |

OTHER PUBLICATIONS

European Search Report issued Apr. 6, 2011 in EP Application No. 10194105.2.
Extended European Search Report issued Aug. 5, 2011 in EP Application No. 10194105.2.

* cited by examiner

*Primary Examiner* — Qian Yang
(74) *Attorney, Agent, or Firm* — Stanzione & Kim, LLP (57) ABSTRACT

A method of executing an additional extended feature of an image forming apparatus, includes receiving an application from an external storage medium, the application corresponding to the additional extended feature, installing the received application using one operating system of the plurality of operating systems, selecting the additional extended feature from a menu showing at least one application installed in the image forming apparatus, and executing an application corresponding to the selected additional extended feature using an operating system corresponding to the selected additional extended feature.

19 Claims, 5 Drawing Sheets

METHOD OF EXECUTING ADDITIONAL EXTENDED FEATURE OF IMAGE FORMING APPARATUS AND IMAGE FORMING APPARATUS TO PERFORM THE SAME

CROSS-REFERENCE TO RELATED APPLICATIONS

This application claims the benefit of priority under 35 U.S.C. §119 from Korean Patent Application No. 10-2009-0130036, filed on Dec. 23, 2009, in the Korean Intellectual Property Office, the disclosure of which is incorporated herein in its entirety by reference.

BACKGROUND

1. Field of the Invention

The present general inventive concept relates to a method of executing an additional extended feature of an image forming apparatus, and an image forming apparatus including the same.

2. Description of the Related Art

Image forming apparatuses including printers, scanners, and multi-function peripherals may perform at least one of various functions such as a printing function, a copying function, a scanning function, a facsimile sending/receiving function, an e-mail sending/receiving function, and a sending function to send files to a server (e.g., server message block/file transfer protocol). Functions executable in image forming apparatuses may be classified as native features and additional extended features. The native features are functions determined during the manufacture of image forming apparatuses, whereas the additional extended features are functions which can be additionally executed according to a user's requirements after the selling of image forming apparatuses. Also, image forming apparatuses can be controlled by operating systems which may allow the image forming apparatus to perform the different functions by executing programs, for example.

SUMMARY

The present general inventive concept provides a method of executing an additional extended feature of an image forming apparatus and an image forming apparatus to perform the same based on a user's preference.

Additional aspects and utilities of the present general inventive concept will be set forth in part in the description which follows and, in part, will be obvious from the description, or may be learned by practice of the present general inventive concept.

Features and/or utilities of the present general inventive concept may be realized by a method of executing an additional extended feature of an image forming apparatus including a display unit and a plurality of operating systems, the method including receiving an application from an external storage medium, the application corresponding to the additional extended feature differing from a native feature basically supported by the image forming apparatus, installing the received application using one operating system of the plurality of operating systems, selecting the additional extended feature from a menu showing at least one application installed in the image forming apparatus displayed on the display unit, and executing an application corresponding to the selected additional extended feature using an operating system corresponding to the selected additional extended feature, wherein the plurality of operating systems include a real-time operating system and a non real-time operating system.

Features and/or utilities of the present general inventive concept may also be realized by an image forming apparatus including a plurality of operating systems including a communication unit to receive an application from an external storage medium, the application corresponding to the additional extended feature differing from a native feature basically supported by the image forming apparatus, an application installing unit to install the received application using one operating system of the plurality of operating systems, a display unit to display a menu showing at least one application installed in the image forming apparatus, an input unit to receive input information to select the additional extended feature from the displayed menu, and a control unit to execute an application corresponding to the selected additional extended feature using an operating system corresponding to the selected additional extended feature. The plurality of operating systems include a real-time operating system and a non real-time operating system.

Features and/or utilities of the present general inventive concept may also be realized by a method of performing an additional function of an image forming apparatus having a basic operating system to perform native functions of the image forming apparatus and an additional operating system to perform an additional function, the additional function not being a native function of the image forming apparatus at a time of manufacture, the method including receiving by the image forming apparatus an application corresponding to the additional operating system, receiving a command to execute the additional function, and executing with the additional operating system the application to execute the additional function.

The method may further include calculating a resource allocation ratio between the basic operating system and the additional operating system.

The resource allocation ratio may be calculated based on at least one of a number of applications that utilize each respective operating system, a resource intensiveness of the applications that utilize each respective operating system, and a frequency with which the applications of each respective operating system have been executed.

Executing the application in the additional operating system may include communicating with the basic operating system to control a hardware component of the image forming apparatus. The basic operating system may be a real-time operating system and the additional operating system may be a non-real-time operating system.

Features and/or utilities of the present general inventive concept may also be realized by an image forming apparatus, including memory to store at least a basic operating system to execute native functions of the image forming apparatus and an additional operating system to control additional functions of the image forming apparatus that are not native functions, a communication unit to receive an application to execute an additional function of the image forming apparatus, an imaging unit to perform imaging functions of the image forming apparatus, and a controller to control operation of the memory, the communication unit, and the imaging unit.

The application to execute the additional function may utilize the additional operating system.

The memory may include a first memory to store, of applications to execute native functions and additional functions, only applications to execute native functions and a second memory to store only applications to execute additional functions.

The communication unit may include a data port to connect to a device external to the image forming apparatus.

The data port may be one of a USB port, an Ethernet port, a telephone port, a serial port, and a wireless antenna.

The control unit may calculate a resource allocation ratio between the basic operating system and the additional operating system.

The control unit may calculate the resource allocation ratio based on at least one of a number of applications that utilize each respective operating system, a resource intensiveness of the applications that utilize each respective operating system, and a frequency with which the applications of each respective operating system have been executed.

The control unit may cause the additional operating system to communicate with the basic operating system to control a hardware component of the image forming apparatus to execute the additional function.

The image forming apparatus may include a user interface unit to receive from a user a command to execute the additional function.

The controller may adjust a display of the user interface unit to correspond to the additional operating system when the user enters the command to execute the additional function.

The communication unit may download the application from a host device external to the image forming apparatus.

The host device may be one of a personal computer, a laptop, and a server.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE EMBODIMENTS

The present general inventive concept will now be described more fully with reference to the accompanying drawings, in which exemplary embodiments of the present general inventive concept are shown.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
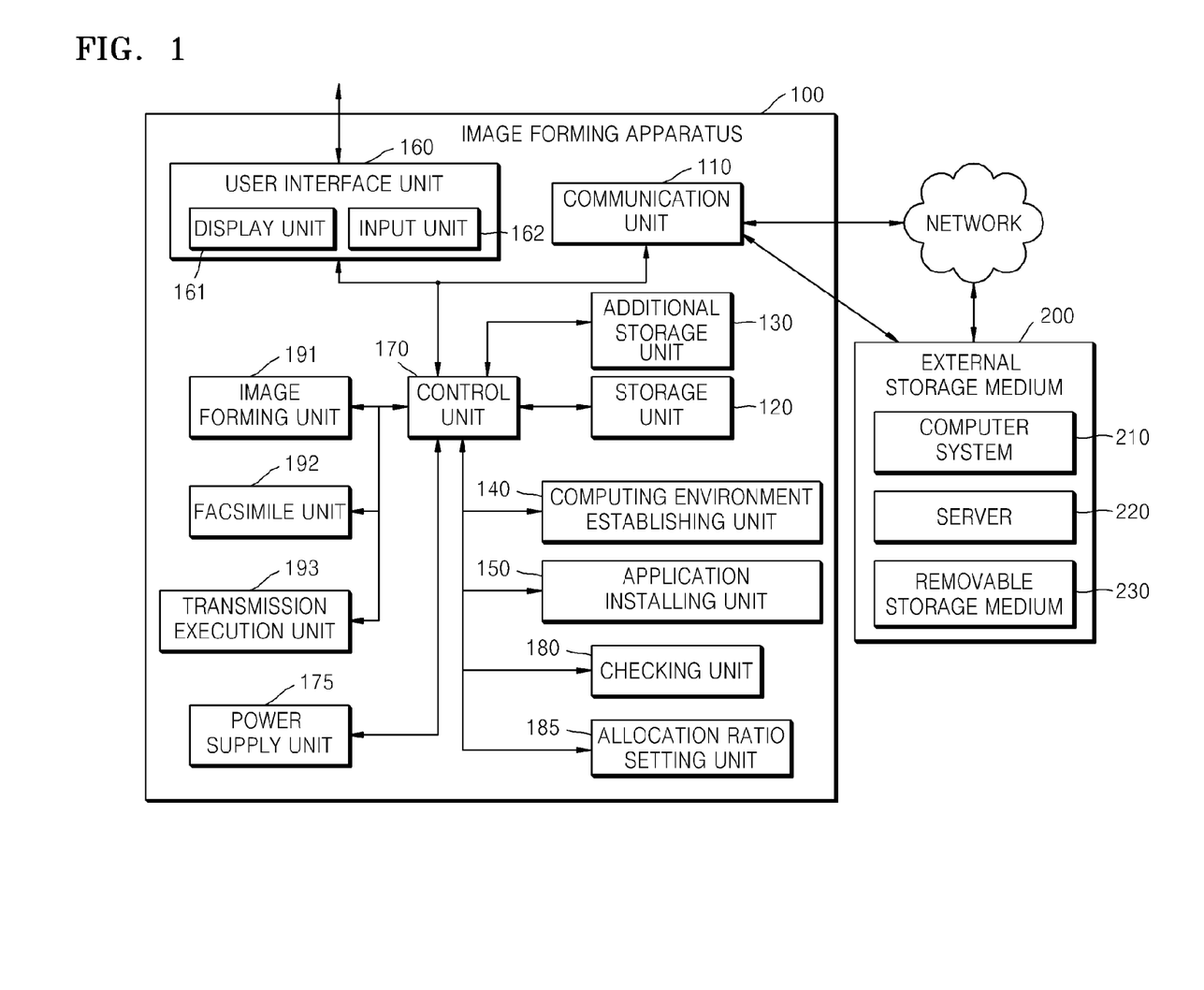
FIG. 1 is a block diagram illustrating an image forming apparatus and an external storage medium according to an embodiment of the present general inventive concept.

FIG. 1 is a block diagram illustrating an image forming apparatus 100 and an external storage medium 200 according to an embodiment of the present general inventive concept. Referring to FIG. 1, the image forming apparatus 100 includes a communication unit 110, a storage unit 120, an additional storage unit 130, a computing environment establishing unit 140, an application installing unit 150, a user interface (UI) unit 160, a display unit 161, an input unit 162, a control unit 170, a power supply unit 175, a checking unit 180, an allocation ratio setting unit 185, an image forming unit 191, a facsimile unit 192, and a transmission execution unit 193.

Although FIG. 1 illustrates elements related to present embodiment are illustrated in the image forming apparatus 100, the image forming apparatus 100 may further include general purpose elements in addition to the elements illustrated in FIG. 1, as will be understood by those of ordinary skill in the art related to the present embodiment.

The image forming apparatus 100 may receive/transmit data from/to the external storage medium 200 which may be connected thereto. The external storage medium 200 may include at least one of a computer system 210, a server 220, and a removable storage medium 230, but it is not limited thereto. Thus, the external storage medium 200 may include all devices which may connect to the image forming apparatus 100 and receive/transmit data from/to the image forming apparatus 100.

The communication unit 110 receives/transmits data from/to the external storage medium 200 via a wired or wireless network, wired serial communication, or any other data port. The network may correspond to the Internet, a local area network (LAN), a wireless LAN, a wide area network (WAN), a personal area network (PAN), or the like. However, the present general inventive concept is not limited thereto, and the network may be any type of network capable of receiving/transmitting data.

Also, the communication unit 110 may include a modem to send and receive a facsimile message, a network module to connect with a network, and a USB host module to provide a data transfer channel with a removable storage medium.

The communication unit 110 may receive a program to provide a computing environment to perform or bring about an additional extended feature and at least one application to utilize the additional extended feature. In other words, the communication unit 110 may download a program corresponding to a computing environment that includes an additional extended feature and an application corresponding to the additional extended feature from the external storage medium 200. The downloading of the program and application may be performed by a basic operating system which is executed by the image forming apparatus 100 or performed by a network file system.

More specifically, when a user of the image forming apparatus 100 selects a graphic user interface (GUI) to download a program indicating a computing environment that realizes an additional extended feature and to download at least one application corresponding to an additional extended feature using the UI unit 160 in a basic operating system environment where the basic operating system is executed, the program and the application may be downloaded to the image forming apparatus 100 from the external storage medium 200. However, those of ordinary skill in the art related to the present embodiment will understand that a user of the image forming apparatus 100 may download at least one of the program and the application to the image forming apparatus 100 using not only the UI unit 160 but also a host device (not shown) which is connected to the image forming apparatus 100 and which controls the image forming apparatus 100. The host device (not shown) may be a personal computer, laptop, server, or other computing device, for example.

An additional extended feature means a function other than native features which are executed by the image forming apparatus 100. A native feature is defined in the specification and claims as a feature that is determined and set up or enabled during the manufacture of the image forming apparatus 100, and may include a copying function, a printing function, a scanning function, a facsimile sending/receiving function, an e-mail sending/receiving function, and a file sending function to a server.

An additional extended feature, or an additional feature or function, according to the present specification and claims, is defined as a function that is not set up or enabled during the manufacture of the image forming apparatus 100 but is added according to a user's instruction after the image forming apparatus 100 is sold to the user. In other words, at the time that the image forming apparatus 100 is sold to a user, the image forming apparatus 100 may be incapable of performing the additional extended feature. However, at a time after the image forming apparatus 100 is acquired by or sold to the user, the user may download a program and/or connect a physical functional apparatus to the image forming apparatus 100 to cause the image forming apparatus 100 to perform the additional extended feature. For example, the additional extended feature may be a function for downloading a file stored in a predetermined server and printing the downloaded file. Also, the additional extended feature may be a function for printing print data transmitted from a host device and for storing the print data in a predetermined server in sequence. That is, when a user desires to perform a plurality of functions one after another, the plurality of functions may be performed easily by executing the additional extended feature, which is set to perform those functions one after another. A user may be an end user, a vendor, or any other user after the image forming apparatus 100 is manufactured.

The storage unit 120 stores the program and the application received through the communication unit 110. The storage unit 120 may store the program and the application into a predetermined region thereof. Accordingly, the checking unit 180 may check the predetermined region of the storage unit 120 to adjust a resource allocation ratio of the image forming apparatus 100 allocated to a plurality of operating systems. The adjustment of the resource allocation ratio of the image forming apparatus 100 will be more fully explained in the description for the checking unit 180 below.

The storage unit 120 may include a read only memory (ROM), a random access memory (RAM), a flash memory, a hard disk drive (HDD) which is a kind of magnetic computer memory device, an optical disk drive, and the like.

The additional storage unit 130 may be additionally installed to allow the image forming apparatus 100 to perform additional extended features. For example, the additional storage unit 130 may be provided both when the storage unit 120 of the image forming apparatus 100 has a sufficient capacity but also when the storage unit 120 of the image forming apparatus 100 has only a capacity sufficient to realize the native features. In other words, the storage unit 120 may have a capacity sufficient to store programs, applications, and/or operation code to support or run only the native features of the image forming apparatus 100. The additional storage unit 130 may include a ROM, a flash memory, etc., as a non-volatile storage device.

A user of the image forming apparatus 100 may additionally install the additional storage unit 130 in an extended memory slot of the image forming apparatus 100 to realize additional extended features, to thereby enable a user to realize the additional extended feature regardless of the storage capacity of the image forming apparatus 100. Accordingly, an application corresponding to the additional extended feature may be executed in the additional storage unit 130.

However, those of ordinary skill in the art related to the present embodiment will understand that the additional storage unit 130 may be selectively installed when it is necessary to realize the additional extended features in the image forming apparatus 100. That is, when the storage unit 120 of the image forming apparatus 100 can execute the additional extended feature, the additional storage unit 130 may not be installed.

The computing environment establishing unit 140 establishes a computing environment to realize the additional extended feature by the use of a program indicating a computing environment realizing the additional extended feature. That is, the communication unit 110 receives a program to establish the computing environment, the storage unit 120 stores the received program, and the computing environment establishing unit 140 installs the stored program, so that it is possible to establish the computing environment realizing the additional extended feature.

The program, which indicates the computing environment realizing the additional extended feature, includes an application-program programming interface (API) library and a Java virtual machine to realize or perform various functions according to user settings.

That is, the computing environment establishing unit 140 may install the API library and the Java virtual machine. The API library provides functions required for applications to execute. For example, the API library may perform a widget function using a user interface according to user settings, or may perform an API interface with various functions performing the native features of the image forming apparatus 100. Also, the API library may include a user interface capable of downloading an application indicating the additional extended feature, or switch a mode between a plurality of operating systems, i.e., between a basic operating system and an additional operating system.

The Java virtual machine may execute a Java application. Accordingly, an application that performs the additional extended feature may be installed and executed by the Java virtual machine. Those of ordinary skill in the art related to the present embodiment will understand the API library and the Java virtual machine, and thus detailed descriptions thereof will be omitted herein.

The native functions of the image forming apparatus 100 are set during the manufacturing thereof, so that the image forming apparatus 100 includes the operating systems necessary to perform the native functions using the native hardware of the image forming apparatus 100. That is, the image forming apparatus 100 may execute at least one additional operating system besides basic operating systems to execute the native features. Also, the basic operating system and the additional operating system may be executed using a hypervisor function when a hardware component included in the image forming apparatus 100 is virtualized.

The hypervisor is a software layer configured to interpose between a currently executing operating system and a hardware component. The hypervisor functionally multiplexes hardware components with respect to the plurality of operating systems, and specifies a resource for each operating system in a virtual manner.

That is, the hypervisor function provides the environment where a plurality of operating systems may be executed in one hardware component. The processing distribution between the plurality of operating systems is determined through a time scheduling method. The term 'time scheduling' means that predetermined times are sequentially distributed to the respective operating systems. Thus, the hypervisor function may realize the environment where the plurality of operating systems are to be executed at the same time.

The hypervisor function allows an additional operating system to be executed by virtualizing a hardware component and generating a virtual machine. The hardware component may be a processor, an I/O port, a memory chip or device, an interrupt device, or the like. The hardware component may include the communication unit 110, the storage unit 120, the additional storage unit 130, the UI unit 160, the control unit 170, the image forming unit 191, the facsimile unit 192, and the transmission execution unit 193, which are necessary to execute operating systems. Those of ordinary skill in the art related to the present embodiment will understand the hypervisor, and thus detailed description of hypervisor will be omitted herein.

Therefore, when the plurality of operating systems are executed in the image forming apparatus 100, limited resources of the image forming apparatus 100 may be effectively utilized using the hypervisor function.

Also, the basic operating system, which is an operating system to execute native features of the image forming apparatus 100, is a real-time operating system typically, but the present invention is not limited thereto. The additional operating system of the present embodiment includes all operating systems with the exception of the basic operating systems. In other words, the basic operating system or systems are defined as the operating systems necessary to perform the native functions of the image forming apparatus 100, and the additional operating systems are defined as the operating systems necessary to perform any additional extended features of the image forming apparatus 100. While one additional operating system will be exemplarily described below for convenience in description, the number of the additional operating system is not limited thereto and a plurality of additional operating systems may be further provided.

The additional operating system is used to realize the additional extended feature of the image forming apparatus 100 and may be a non-real-time operating system. However, the additional operating system is not limited to the non real-time operating system, and thus may also be a real-time operating system.

A real-time operating system may be defined as an operating system that ensures an interrupt to be processed in a given time, and may include VxWork, pSOS, etc. On the other hand, non-real-time operating systems may include Linux, WinCE, and so forth. In other words, while a real-time operating system is designed so that each interrupt or action may be performed within a predetermined period of time, a non-real time operating system is not designed to guarantee that an action or interrupt is executed within a predetermined period of time.

The basic operating system and the additional operating systems may be installed during the manufacture of the image forming apparatus 100. Accordingly, to execute the additional extended feature, the image forming apparatus 100 receives a program indicating a computing environment that realizes the additional extended feature and establishes the computing environment to realize the additional extended feature using the received program. The computing environment may be established by rebooting only the additional operating system of the image forming apparatus 100.

However, those of ordinary skill in the art related to present embodiment will understand that the computing environment realizing the additional extended feature may be realized during the manufacture of the image forming apparatus 100, and thus the image forming apparatus 100 may not include the computing environment establishing unit 140.

Specifically, when the computing environment realizing the additional extended feature is established in the image forming apparatus 100, i.e., when the API library and the Java virtual machine are installed as described above, the computing environment establishing unit 140 according to the present embodiment may not be included in the image forming apparatus 100.

The application installing unit 150 installs an application received from the communication unit 110 using one of the plurality operating systems. That is, the communication unit 110 receives an application corresponding to the additional extended feature from the external storage medium 200, the storage unit 120 stores the received application, and the application installing unit 150 then installs the stored application.

The application installing unit 150 installs the application using one of the plurality of operating systems. One operating system used to install the application corresponds to the additional extended feature.

Also, in order to install the application corresponding to the additional extended feature, the application installing unit 150 may install the application by rebooting only an operating system corresponding to the application which corresponds to the additional extended feature. In particular, the application installing unit 150 installs the application by rebooting only the operating system corresponding to the application to be installed using a hypervisor function.

As described above, the hypervisor functionally multiplexes hardware components with respect to the plurality of operating systems, and provides the environment where the plurality of operating systems are executed in one hardware component virtually. Thus, the application installing unit 150 may install the application by rebooting only an operating system corresponding to the application that a user wishes to install.

Hence, even when a user installs an application indicating an additional extended feature, various functions may be performed in the image forming apparatus 100 using an operating system that differs from the operating system corresponding to the application.

The UI unit 160 receives input information from the user and displays output information. Referring to FIG. 1, the UI unit 160 includes the display unit 161 and the input unit 162. Those of ordinary skill in the art related to the present embodiment will understand that the display unit 161 and the input unit 162 may be present in a combined form such as a touchpad.

The display unit 161 displays a menu showing at least one application installed in the image forming apparatus 100. More specifically, the display unit 161 may display a list of applications installed in the image forming apparatus 100 in an environment where the additional operating systems may be executed, and the input unit 162 may receive input information to select one application which indicates an additional extended feature of the displayed list. That is, a plurality of applications which a user wishes to use may be installed in the image forming apparatus 100, and the display unit 161 displays a list of the installed applications using a GUI.

For example, as one type of menu, the display unit 161 may display icons respectively showing a plurality of applications and a user may execute the additional extended feature by operating the input unit 162, e.g., by touching one of the displayed icons that a user wishes to use.

The display unit 161 may display a GUI for converting a basic operating system environment into an additional operating system environment or converting the additional operating system environment into the basic operating system environment. That is, it is possible to realize or perform a function of switching a mode between the basic operating system and the additional operating system, and thus a user selects an icon showing a mode switching to thereby switch the mode between the basic operating system and the additional operating system.

Also, the display unit 161 may further display a GUI that downloads an application corresponding to the additional extended feature in an additional operating system environment. That is, a function of downloading an application from the external storage medium 200 may be realized, and accordingly a user may enable an application to be downloaded to the image forming apparatus 100 from the external storage medium 200 by manipulating the input unit 162 and selecting an icon for downloading the application.

More specifically, the display unit 161 displays a plurality of applications stored in the external storage medium 200 or information about the plurality of applications stored in the external storage medium 200, and the input unit 162 receives information for searching for an application corresponding to an additional extended feature among the plurality of applications. That is, by manipulating the input unit 162, a user inputs information to search for an application among the plurality of applications, wherein the application corresponds to the additional extended feature and is intended to be executed in the image forming apparatus 100. Here, information for searching for the application means a topic word of the application corresponding to the additional extended feature.

The display unit 161 displays the search result, and the input unit 162 receives information to select the application corresponding to the additional extended feature among the plurality of applications stored in the external storage medium 200. That is, a user manipulates the input unit 162 to input information to select the application corresponding to the additional extended feature that a user wishes to execute in the image forming apparatus 100.

Accordingly, the communication unit 110 receives an application corresponding to the received information, and the application installing unit 150 may install the received application. Therefore, a user may conveniently search for applications stored in the external storage medium 200 and receive at least one application according to the search result.

However, those of ordinary skill in the art related to present embodiment will understand that a user of the image forming apparatus 100 may perform at least one of the mode switching operation and the application downloading operation using not only the UI unit 160 but also a host device (not shown) that is connected to the image forming apparatus 100 and that controls the image forming apparatus 100.

The UI unit 160 for receiving input information from a user and providing output information to the user includes an input/output module and a software module to implement the input/output module, which are provided in the image forming apparatus 100. Here, the input/output module may be a keyboard, a mouse, a touchpad, a monitor displaying a GUI and a local user interface (LUI), a liquid crystal display (LCD), a display panel, or the like.

The control unit 170 controls overall functions of the image forming apparatus 100. Also, the control unit 170 controls an application corresponding to an additional extended feature to be executed, which is selected on the basis of information input from the input unit 162 by the use of an operating system corresponding to an additional extended feature.

When the input information to select the additional extended feature is received from the input unit 162, the control unit 170 uses an interface agent provided in each of the plurality of operating systems to thereby switch a current operating system into an operating system corresponding to an additional extended feature, which is selected on the basis of the received input information.

For example, when input information is received in the basic operating system environment to select an additional extended feature operating on an additional operating system, the control unit 170 switches a usage environment of the image forming apparatus 100 from a basic operating system to an additional operating system.

The term 'switching'' as used in the present specification and claims means the conversion of a usage environment. That is, the switching of the operating systems may be performed using an interface agent provided in each of the plurality of operating systems in order to convert the usage environment of the image forming apparatus 100 indicating a user interface or the like which is displayed on the display unit 161 of the image forming apparatus 100. The interface agent will be described in detail below.

As the control unit 170 switches the usage environment of the image forming apparatus 100 from the basic operating system to the additional operating system, the display unit 161 displays a user interface according to the switched operating system. Thus, the image forming apparatus 100 may switch a usage environment from an environment of a user interface showing native features according to the basic operating system into an environment of a user interface showing additional extended features according to the additional operating system.

Therefore, a user may switch the usage environment between the basic operating system and the additional operating system conveniently.

Since the image forming apparatus 100 establishes a system using a hypervisor function, it is possible to reduce fabrication cost for products at the initial stage and selectively execute only a function required by a user among various additional extended features. Also, since additional installation of the additional storage unit 130 enables a user to realize the additional extended feature even when the image forming apparatus 100 is not a high-capacity image forming apparatus, the compatibility of the additional extended feature may be enhanced.

The power supply unit 175 supplies power to the image forming apparatus 100. As power is supplied to the image forming apparatus 100 by the power supply unit 175, the control unit 170 controls the image forming apparatus 100 to operate in a preset operating system. Here, the preset operating system is set by a user, and may be any one of a plurality of operating systems.

For example, when a user sets the image forming apparatus 100 to operate according to an additional operating system environment when the image forming apparatus 100 boots up, the control unit 170 controls the image forming apparatus 100 to operate according to the additional operating system environment when power is supplied to the image forming apparatus 100 from the power supply unit 175. Also, the display unit 161 may further display that the image forming apparatus 100 is operated by an additional operating system.

The checking unit 180 checks whether the computing environment realizing the additional extended feature is established and whether an application corresponding to the additional extended feature is installed. That is, as explained in the description for the storage unit 120, because the program and application indicating the computing environment, which are received through the communication unit 110, are stored in a predetermined region of the storage unit 120, the checking unit 180 may check the establishment of the computing environment by checking the predetermined region of the storage unit 120. Also, the checking unit 180 checks the predetermined region of the storage unit 120, and may also check the installation of the application.

When the computing environment is established and at least one application is installed according to the check result of the checking unit 180, the allocation ratio setting unit 185 sets a resource allocation ratio of the image forming apparatus 100 again, which is allocated to execute the basic operating system and the additional operating system. That is, in the case of executing a plurality of operating systems using a hypervisor function, the time sharing allocation ratio of resources of the image forming apparatus 100 in each of the plurality of operating systems may be adjusted. Therefore, a resource allocation ratio may be set for each of the plurality of operating systems, to thereby enable a user to effectively use resources of the image forming apparatus 100.

For example, when the additional extended feature is not used in the image forming apparatus 100, the resource allocation ratio of the image forming apparatus 100, which is allocated to execute the additional extended feature, should be minimized to allow the native feature to be executed in the basic operating system.

In detail, when the computing environment is established and the application corresponding to the additional extended feature is installed according to the check result of the checking unit 180, the allocation ratio setting unit 185 decreases the resource allocation ratio of the image forming apparatus 100 which is allocated to the basic operating system by a predetermined ratio, and increases the resource allocation ratio of the image forming apparatus 100 which is allocated to the additional operating system by the predetermined ratio.

For example, at a time when the image forming apparatus 100 boots up, a communication may be established between a plurality of operating systems executed in the image forming apparatus 100, and the checking unit 180 checks, according to the communication result, whether the computing environment is established or whether the application is installed on the additional operating system. During the manufacture of the image forming apparatus 100, that is, when the computing environment realizing the additional operating system is not established and the application is not installed, the resource allocation ratio between the basic operating system and the additional operating system of the image forming apparatus 100 may be 9:1.

When the computing environment realizing the additional operating system is established and the application indicating the additional extended feature is installed after the selling of the image forming apparatus 100, the resource allocation ratio between the basic operating system and the additional operating system of the image forming apparatus 100 may be 6:4. The resource allocation ratio of 9:1 or 6:4 described above is merely provided for illustrative purpose, and thus the resource allocation ratio may differ.

Also, the allocation ratio setting unit 185 may set the resource allocation ratio of the image forming apparatus 100, which is allocated to the additional operating system, to increase according to the increase in the number of installed applications.

As the input unit 162 receives input information to select the additional extended feature and the control unit 170 switches an operating system to an operating system corresponding to the additional extended feature that is selected based on the received input information, the allocation ratio setting unit 185 may set the resource allocation ratio of the image forming apparatus 100 again according to the above-described method.

Since the image forming apparatus 100 may change the resource allocation ratio of the image forming apparatus 100 according to whether an application corresponding to the additional extended feature is present or not, limited resources may be effectively utilized.

The image forming unit 191, the facsimile unit 192, and the transmission execution unit 193 perform various functions of the image forming apparatus 100. The image forming unit 191 performs printing job of files, the facsimile unit 192 performs facsimile sending/receiving of files, and the transmission execution unit 193 transmits files to an external device such as a computing system 210, a server 220, and a removable storage medium 230.

The external storage medium 200 provides at least one of a program for establishing a downloadable computing environment in the image forming apparatus 100 and an application corresponding to an additional extended feature in the image forming apparatus 100. Referring to FIG. 1, the external storage medium 200 includes the computer system 210, the server 220, and the removable storage medium 230.

Those of ordinary skill in the art related to the present embodiment will understand that the computer system 210 may include a host unit controlling the image forming apparatus 100, and the removable storage medium 230 may include a universal serial bus (USB) memory stick, and a memory card as a portable storage medium.

That is, a manufacturing company of the image forming apparatus 100 and a relevant cooperating company manages the computer system 210 or the server 220, and stores at least one of a program for establishing a computing environment and an application providing an additional extended feature in the computer system 210 or the server 220.

The image forming apparatus 100 may receive programs and applications while being connected to the computer system 210 or the server 220 or when the programs and applications are being stored in the removable storage medium 230.

A manufacturing company of the image forming apparatus 100 may include a company of manufacturing software as well as hardware of the image forming apparatus 100. Also, a cooperating company may include not only a company which is associated with the manufacturing company of the image forming apparatus 100 and which cooperates to manufacture the image forming apparatus 100, but also a company that produces programs executable in the image forming apparatus 100 after the selling of the image forming apparatus 100.

Therefore, the image forming apparatus 100 may download various programs from the external storage medium 200, to thereby enable a variety of additional extended features satisfying a user's requirements to be realized. Since an application to realize the additional extended feature may be used in many kinds of image forming apparatuses 100, product extendibility may increase and reliability may be enhanced.

Figure 2:
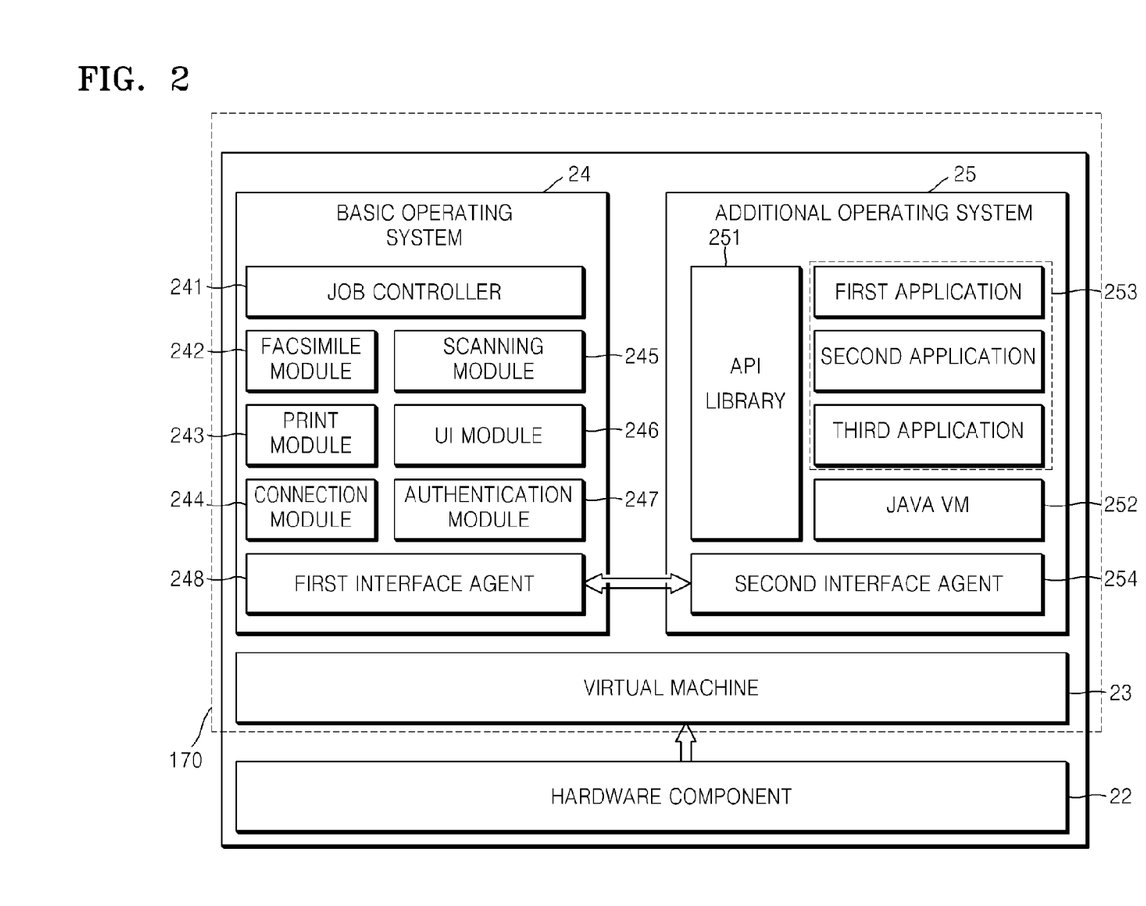
FIG. 2 is a block diagram illustrating the image forming apparatus in which a basic operating system and an additional operating system are realized according to an embodiment of the present general inventive concept.

FIG. 2 is a block diagram illustrating the image forming apparatus 100 in which a basic operating system and an additional operating system are realized, according to an embodiment of the present general inventive concept. Referring to FIG. 2, the image forming apparatus 100 includes a hardware component 22 and a virtual machine 23 created according to the execution of a hypervisor function. A basic operating system 24 and an additional operating system 25 may be respectively executed on the virtual machine 23 according to the execution of the hypervisor function. The basic operating system 24 and the additional operating system 25 may include software modules that perform various functions, which will be more specifically described below.

The basic operating system 24 may also be referred to as the native operating system, and, as discussed above, it is the operating system installed by the manufacturer of the image forming apparatus 100 to perform the native functions of the image forming apparatus 100, such as printing, scanning, and faxing. For example, the basic operating system 24 may control the operation of every function of the image forming apparatus 100 at a time that the image forming apparatus 100 is manufactured, or when the apparatus 100 is provided from a manufacturer to a vendor or user. A job controller 241 controls a plurality of software modules so as to perform various functions of the basic operating system 24.

A facsimile module 242 performs a facsimile sending/receiving; a print module 243 prints image data onto a printing paper; a connection module 244 connects the image forming apparatus 100 to the external storage medium 200 and processes transmitted/received data; a scanning module 245 generates image data by scanning the original copy; a UI module 246 generates and controls a user interface; and an authentication module 247 authenticates the image informing apparatus 100. Also, a first interface agent 248 transmits/receives data between the basic operating system 24 and the additional operating system 25.

The additional operating system 25 performs an additional extended feature of the image forming apparatus 100. The additional operating system 25 may be installed at the time of manufacture of the image forming apparatus 100 or may be downloaded or connected via a memory device or other electronic equipment after the image forming apparatus 100 has been manufactured. In other words, the basic operating system 24 may perform each native function of the image forming apparatus 100, and one or more additional operating systems 25 may be stored in the image forming apparatus simultaneously with the basic operating system 24 to perform functions of the additional extended features of the image forming apparatus 100. The Additional extended features may be enabled by downloading one or more programs or applications to the image forming apparatus 100, or by connecting a physical device, such as a functional unit including electronic components, to the image forming apparatus 100.

An API library 251 provides various functions required to execute applications, and a Java virtual machine (VM) 252 provides a function of executing a Java application. Applications 253 represent a plurality of applications installed in the image forming apparatus 100. That is, a first application, a second application, and a third application may execute additional extended features, respectively. Also, a second interface agent 254 transmits/receives data between the basic operating system 24 and the additional operating system 25.

The first and second interface agents 248 and 254 are provided for communication between the basic operating system 24 and the additional operating system 25 illustrated in FIG. 2, and those of ordinary skill in the art related to the present embodiment will understand that the first and second interface agents 248 and 254 include all software modules that perform communication between the plurality of operating systems.

In the present embodiment, the virtual machine 23, the basic operating system 24, and the additional operating system 25 may be included in the control unit 170 of FIG. 1. That is, those of ordinary skill in the art related to the present embodiment will understand that FIG. 2 is a diagram illustrating that software modules according to the execution result of the control unit 170 are classified according to their functions. Also, it will be understood that the hardware component 22 includes the communication unit 110, the storage unit 120, the additional storage unit 130, the UI unit 160, the image forming unit 191, the facsimile unit 192, and the transmission execution unit 193, which are illustrated in FIG. 1.

Figure 3:
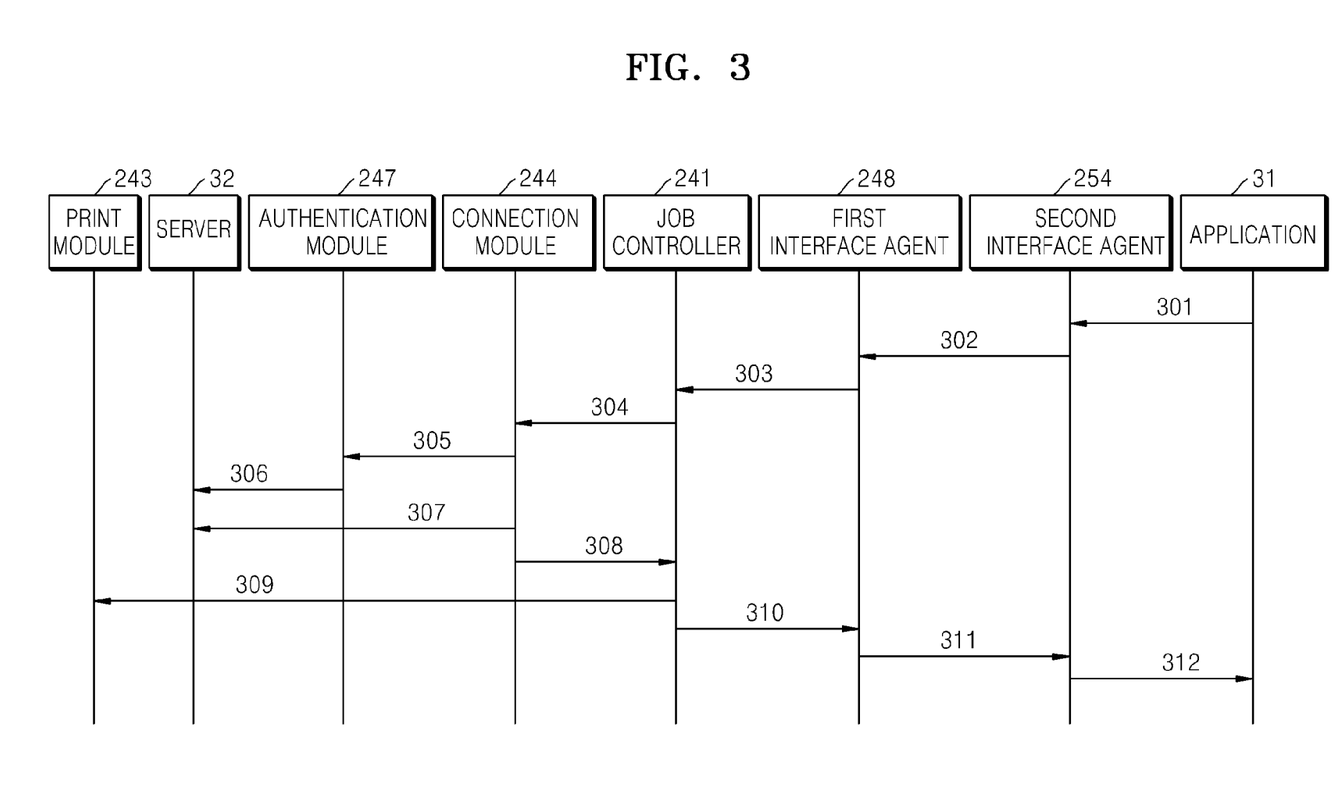
FIG. 3 is a data flowchart to execute an application to print a file stored in a server according to an embodiment of the present general inventive concept.

FIG. 3 is a data flowchart for executing an application 31 to print a file stored in a server 32, according to an embodiment of the present general inventive concept. For the sake of convenience, the description below will be made with reference to FIG. 2 and FIG. 3. FIG. 3 illustrates an example of executing the application 31 to print a file stored in the server 32, or to print a created file stored in the server 32 in the image forming apparatus 100 when the file has been transferred to the server 32. A user may perform printing of a file stored in the server 32 through the simple operation of selecting an icon representing the application 31 in an additional operating system environment where an additional operating system is executed.

In operation 301, the application 31 requests the second interface agent 254 to print a file stored in a server 32. In operation 302, the second interface agent 254 transmits a command to perform the operation requested by the application 31 to the first interface agent 248.

In operation 303, the first interface agent 248 requests the job controller 241 to begin performing a job indicated by the application 31, and in operation 304, the job controller 241 requests a connection module 244 to receive data from the server 32.

In operation 305, the connection module 244 requests the authentication module 247 to perform user authentication, and in operation 306, the authentication module 247 transmits user authentication information to the server 32. In the present embodiment, operations 305 to 306 may be performed only if authentication is required. Also, the user authentication information for authentication may be obtained by receiving authentication information input by a user.

In operation 307, when the user is an authenticated user, the connection module 244 receives data of the authenticated user, and in operation 308, the connection module 244 transmits state information to the job controller 241 indicating that a job for data request has been completed.

In operation 309, the job controller 241 requests the print module 243 to perform a printing job, and in operation 310, the job controller 241 transmits state information to the first interface agent 248 indicating that a job assigned by the application 31 has been completed. In operation 311, the first interface agent 248 transmits state information to the second interface agent 254 indicating that a job assigned by the application 31 has been completed, and in operation 312, the second interface agent 254 transmits state information to the application 31 indicating that a job assigned by the application 31 has been completed. Accordingly, the image forming apparatus 100 displays the state information on the display unit 161 indicating that jobs assigned by the application 31 have been completed. Thus, a user may perform an additional extended feature of the image forming apparatus 100 through a simple operation.

Figure 4:
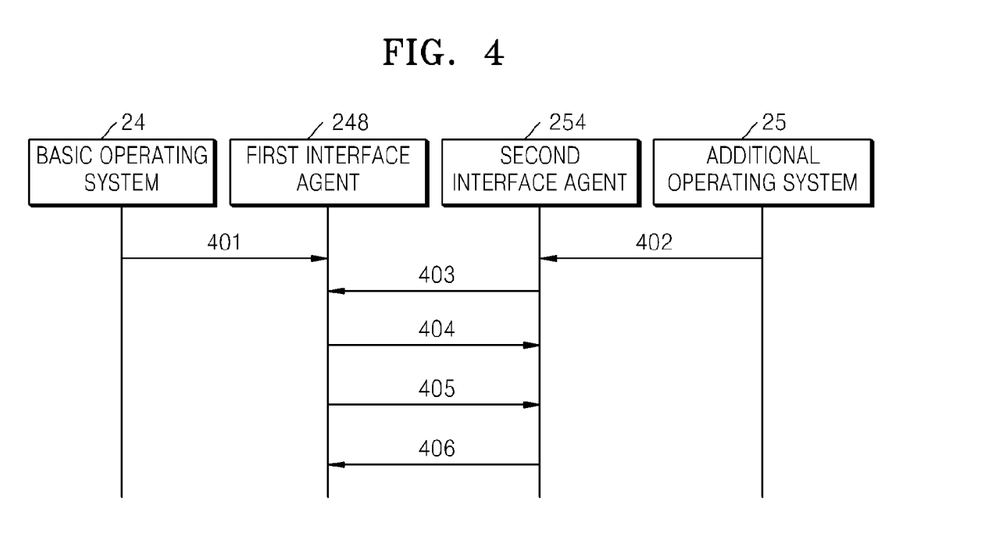
FIG. 4 is a data flowchart for changing a resource allocation ratio of an image forming apparatus according to an embodiment of the present general inventive concept.

FIG. 4 is a data flowchart for changing a resource allocation ratio of an image forming apparatus 100 according to an embodiment of the present general inventive concept. For the sake of convenience, description below will refer to both FIG. 2 and FIG. 4.

At a time when the image forming apparatus 100 boots up, the allocation ratio setting unit 185 may adjust the resource allocation ratio between the basic operating system 24 and the additional operating system 25. In operation 401, when the basic operating system 24 is executed, an initialize request is made to the first interface agent 248, and in operation 402, when the additional operating system 25 is executed, an initialize request is made to the second interface agent 254.

In operation 403, when the initialization of the second interface agent 245 is completed, the second interface agent 254 requests a connection to the first interface agent 248. However, the connection request may be made by the first initialized interface agent between the first and second interface agents 248 and 254. For example, if the first interface agent 248 initializes first, then the first interface agent 248 may request a connection to the second interface agent 254. In operation 404, the first interface agent 248 transmits state information to the second interface agent 254 indicating that connection has been made.

In operation 405, the first interface agent 248 transmits a command (query info, for example) to the second interface agent 254 to acquire state information of the additional operating system 25. In operation 406, the second interface agent 254 transmits information to the first interface agent 248 indicating check results of whether a program indicating a computing environment exists and whether an application exists. Accordingly, the allocation ratio setting unit 185 illustrated in FIG. 1 may change the resource allocation ratio of the image forming apparatus 100.

In this manner, the image forming apparatus 100 may control the resource allocation ratio of the image forming apparatus 100 according to whether a computing environment realizing an additional extended feature and an application is established at initial booting.

Figure 5:
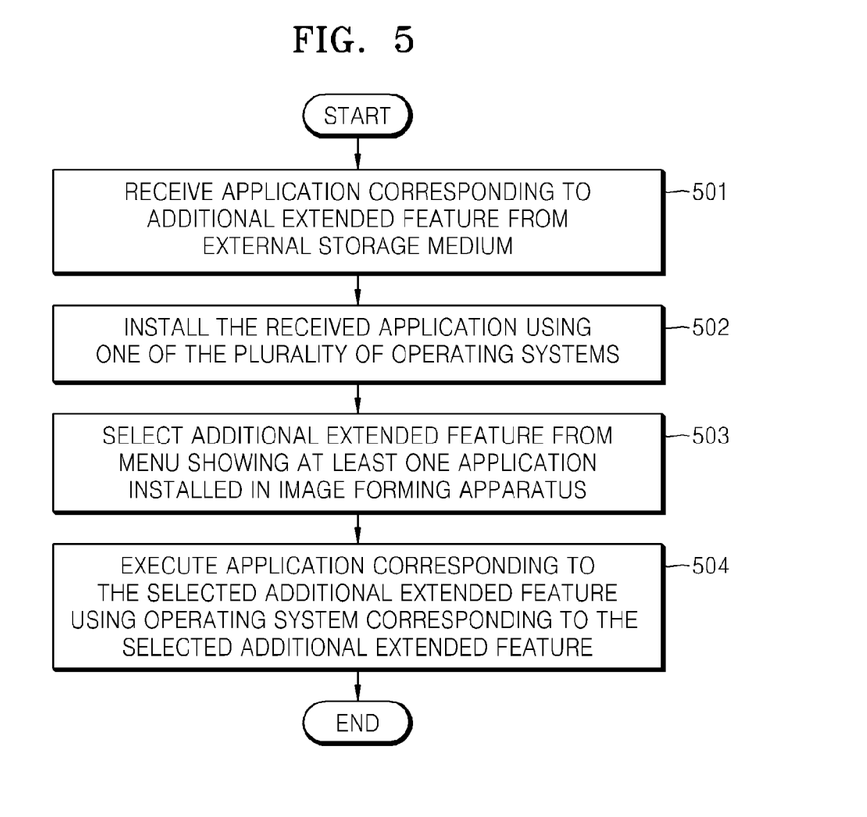
FIG. 5 is a flowchart illustrating a method of executing an additional extended feature of an image forming apparatus according to an embodiment of the present general inventive concept.

FIG. 5 is a flowchart illustrating a method of executing an additional extended feature of an image forming apparatus 100 according to an embodiment of the present general inventive concept. Referring to FIG. 5, the method illustrated in FIG. 5 includes operations which are time-serially processed in the image forming apparatus 100 of FIG. 1. Therefore, even if descriptions are omitted below, the descriptions provided above regarding the image forming apparatus 100 in FIG. 1 also apply to the method illustrated in FIG. 5.

In operation 501, the communication unit 110 receives an application corresponding to an additional extended feature from the external storage medium 200. As discussed above, the additional extended feature is a function differing from a native feature basically supported by the image forming apparatus 100.

In operation 502, the application installing unit 150 installs the application received in operation 501, using an operating system among a plurality of operating systems.

In operation 503, a user manipulates the input unit 162 to select an additional extended feature from a menu showing at least one application installed in the image forming apparatus 100 that is displayed on the display unit 161. That is, the input unit 162 receives input information used to select an additional extended feature that a user wishes to execute in the image forming apparatus 100 from the menu showing the at least one application installed in the image forming apparatus 100.

In operation 504, the control unit 170 executes the selected additional extended feature, using an operating system corresponding to the selected additional extended feature.

Thus, an additional extended feature that satisfies a user's requirements may be executed in the image forming apparatus 100, and the development of additional applications can increase the sales amount of manufacturing companies of the image forming apparatus 100 and relevant cooperating companies.

As described above, an additional extended feature that satisfies a user's requirements can be reliably performed in an image forming apparatus, and also, compatibility of an application corresponding to an additional extended feature may be improved. Therefore, convenience may be improved for users of an image forming apparatus, and profits may increase for manufacturing companies of the image forming apparatus 100 and relevant cooperating companies.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

The present general inventive concept provides an image forming apparatus 100 with an ability to provide additional services, features, or functions beyond those provided during manufacture of the image forming apparatus 100. For example, if the image forming apparatus 100 performs only copying, printing, faxing, and emailing when the image forming apparatus 100 is manufactured, the image forming apparatus 100 may receive an additional storage unit 130 or other module to allow the image forming apparatus 100 to perform additional functions. The additional storage unit 130 may include memory to store one or more operating systems, programs, or applications that may be downloaded to or used by the image forming apparatus 100 to perform the additional functions. Alternatively, the programs or applications may allow the image forming apparatus 100 to communicate with another computing apparatus, such as an external storage medium 200 via a network to receive code to control the image forming apparatus 100 to perform the additional functions or features.

The additional functions or features may include any functions or features not included at the time of manufacture, such as functions to control imaging capabilities of the image forming unit 191, functions to control facsimile communications protocol or operation of the facsimile unit 192, display features to provide a new display to the display unit 161, or any other function not included with the image forming apparatus 100 at the time of manufacture.

The image forming apparatus 100 may have stored therein one or more operating systems at the time of manufacture to perform the native functions of the image forming apparatus. According to one embodiment, one basic operating system may control the functions of each native feature of the image forming apparatus 100, and the additional operating systems may control the operation of the additional features of the image forming apparatus 100. The additional operating systems may correspond to hardware devices or may share the same hardware devices, such as the control unit 170, image forming unit 191, etc. with the basic operating system.

The control unit 170 may control a resource allocation ratio between the plurality of operating systems. The resource allocation ratio may be based upon the number of applications using each operating system, historical trends regarding how often each operating system is used, the intensity with which the respective operating systems utilize the resources, such as the control unit 170 and the storage unit 120, or any other metric.

Figure 6:
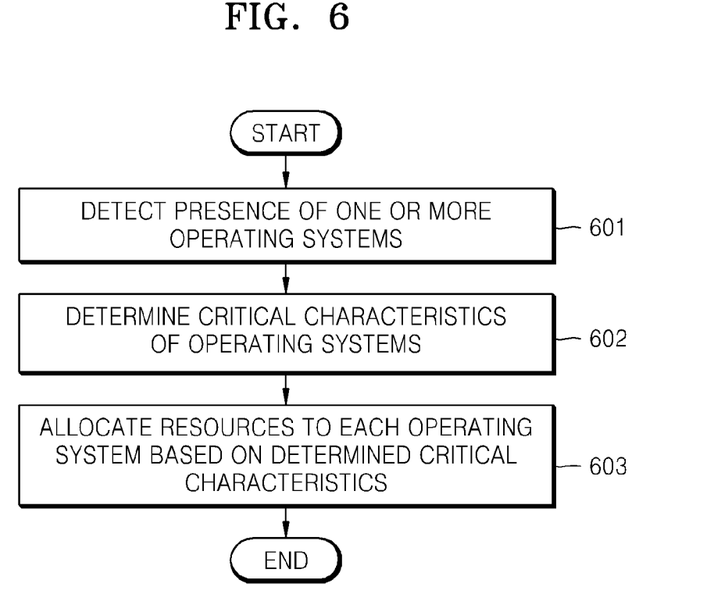
FIG. 6 is a flow chart illustrating a method of calculating a resource allocation ratio.

For example, FIG. 6 illustrates a method of determining a resource allocation ratio between two operating systems in the image forming apparatus 100.

In operation 601, the control unit 170 may detect the presence of one or more operating systems. For example, if two operating systems are stored in the storage unit 120, the control unit 170 may detect whether applications exist to utilize each of the two operating systems. If applications exist to utilize only one of the operating systems, then only the one operating system may be detected. Alternatively, only the basic operating system that was loaded to the storage unit 120 or the control unit 170 at the time of manufacture may be located in the image forming apparatus 100 because a second operating system may not have been installed.

Upon detecting a plurality of operating systems, the control unit 170 may detect in operation 602 one or more critical characteristics of the operating systems to determine a resource allocation ratio. The critical characteristics may include a number of applications using the operating system, the resource-intensiveness of the applications, a type of operating systems, such as real-time or non-real-time, or any other critical characteristic. For example, if the basic operating system is a real-time operating system that includes predetermined periods of time by which certain functions must be performed, and if the additional operating system is a non-real-time operating system, then the resource allocation ratio may be weighted to provide the basic operating system with greater access to the control unit 170 than the additional operating system. Alternatively, if the control unit 170 determines that a user uses the additional features of the additional operating system more often than those of the basic operating system, then the control unit 170 may weight the resource allocation ratio in favor of the additional operating system.

In operation 603, the control unit 170 sets the resource allocation ratio between the operating systems based on the comparison of the critical characteristics of operation 602.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A method of executing an additional extended feature of an image forming apparatus including a display unit and a plurality of operating systems, the method comprising:
receiving a program indicative of a computing environment realizing the additional extended feature from an external storage medium;
establishing the computing environment realizing the additional extended feature by installing the received program;
receiving an application from the external storage medium, the application corresponding to the additional extended feature differing from a native feature basically supported by the image forming apparatus;
installing the received application using one operating system of the plurality of operating systems;
selecting the additional extended feature from a menu showing at least one application installed in the image forming apparatus displayed on the display unit; and
executing an application corresponding to the selected additional extended feature using an operating system corresponding to the selected additional extended feature,
wherein the plurality of operating systems are executed on a virtual machine and include a real-time operating system and a non-real-time operating system at the same time, and
the image forming apparatus comprises at least one of a printing module, a scanning module, a fax module, and a copy module.

2. The method of claim 1, further comprising:
searching, in the image forming apparatus, for an application corresponding to the additional extended feature among a plurality of applications stored in the external storage medium; and
selecting an application corresponding to the additional extended feature among the plurality of applications stored in the external storage medium according to a search result,
wherein the receiving of the application from the external storage medium comprises receiving the selected application.

3. The method of claim 1, further comprising setting a resource allocation ratio for each of the plurality of operating systems.

4. The method of claim 1, further comprising, when the additional extended feature is selected, changing a user interface (UI) displayed on the display unit by switching an operating system into an operating system corresponding to the selected additional extended feature using an interface agent provided in each of the plurality operating systems.

5. The method of claim 4, further comprising setting a resource allocation ratio when an operating system is switched to an operating system corresponding to the selected additional extended feature.

6. The method of claim 1, wherein the installing of the received application comprises installing the application by rebooting only an operating system corresponding to the application using a hypervisor function.

7. The method of claim 1, further comprising supplying power to the image forming apparatus,
wherein the image forming apparatus operates in a preset operating system.

8. The method of claim 1, further comprising displaying on the display unit that an operating system changes into an operating system corresponding to the additional extended feature.

9. The method of claim 1, further comprising additionally installing an additional storage unit to realize the additional extended feature in the image forming apparatus,
wherein the executing of the application comprises executing an application corresponding to the selected additional extended feature using the additional storage unit.

10. An image forming apparatus including a plurality of operating systems, comprising:
a communication unit to receive a program indicative of a computing environment realizing an additional extended feature and to receive an application from an external storage medium, the application corresponding to the additional extended feature differing from a native feature basically supported by the image forming apparatus;
a computing environment establishing unit to establish a computing environment realizing the additional extended feature by installing the received program;
an application installing unit to install the received application using one operating system of the plurality of operating systems;
a display unit to display a menu showing at least one application installed in the image forming apparatus;
an input unit to receive input information to select the additional extended feature from the displayed menu; and
a control unit to execute an application corresponding to the selected additional extended feature using an operating system corresponding to the selected additional extended feature,
wherein the plurality of operating systems are executed on a virtual machine and include a real-time operating system and a non-real-time operating system at the same time,
the image forming apparatus comprises at least one of a printing module, a scanning module, a fax module, and a copy module.

11. The image forming apparatus of claim 10, wherein the input unit receives information to search for an application corresponding to the additional extended feature among a plurality of applications stored in the external storage medium and receives information to select an application corresponding to the additional extended feature among the plurality of applications stored in the external storage medium according to a search result.

12. The image forming apparatus of claim 10, wherein the control unit sets a resource allocation ratio for each of the plurality of operating systems.

13. The image forming apparatus of claim 10, wherein, when the control unit receives input information to select the additional extended feature, the control unit switches an operating system into an operating system corresponding to the selected additional extended feature using an interface agent provided in each of the plurality operating systems, and
the display unit displays a user interface according to the switched operating system.

14. The image forming apparatus of claim 13, further comprising an allocation ratio setting unit to set the resource allocation ratio again when an operating system is switched into an operating system corresponding to the selected additional extended feature.

15. The image forming apparatus of claim 10, wherein the application installing unit installs the application by rebooting only an operating system corresponding to the application using a hypervisor function.

16. The image forming apparatus of claim 10, further comprising a power supply unit to supply power to the image forming apparatus,
wherein the image forming apparatus operates in a preset operating system set by a user, and wherein the preset operation system may be any one of the plurality of operating systems.

17. The image forming apparatus of claim 10, wherein the display unit further displays that an operating system changes into an operating system corresponding to the additional extended feature.

18. The image forming apparatus of claim 10, further comprising an additional storage unit additionally installed to realize the additional extended feature,
wherein the control unit executes an application corresponding to the selected additional extended feature using the additional storage unit.

19. A method of performing an additional function of an image forming apparatus having a basic operating system to perform native functions of the image forming apparatus and an additional operating system to perform the additional function, the additional function not being a native function of the image forming apparatus at a time of manufacture, the method comprising:
receiving by the image forming apparatus a program indicative of a computing environment realizing the additional function from an external storage medium;
establishing the computing environment realizing the additional function by installing the received program in the image forming apparatus;
receiving and installing by the image forming apparatus an application corresponding to the additional operating system;
receiving a selection of the additional function to execute the additional function; and
executing with the additional operating system the application to execute the additional function,
wherein the image forming apparatus comprises at least one of a printing module, a scanning module, a fax module, and a copy module,
and wherein the operating systems are executed on a virtual machine and include a real-time operating system and a non-real-time operating system at the same time.

* * * * *